United States Patent
Nook et al.

(10) Patent No.: US 11,254,213 B2
(45) Date of Patent: Feb. 22, 2022

(54) PORTABLE OR HAND HELD VEHICLE BATTERY JUMP STARTING APPARATUS WITH BATTERY CELL EQUALIZATION CIRCUIT

(71) Applicant: THE NOCO COMPANY, Glenwillow, OH (US)

(72) Inventors: Jonathan Lewis Nook, Gates Mills, OH (US); William Knight Nook, Sr., Shaker Heights, OH (US); James Richard Stanfield, Peoria, AZ (US); Derek Michael Underhill, Tempe, AZ (US)

(73) Assignee: THE NOCO COMPANY, Glenwillow, OH (US)

( * ) Notice: Subject to any disclaimer, the term of this patent is extended or adjusted under 35 U.S.C. 154(b) by 244 days.

(21) Appl. No.: 16/461,562

(22) PCT Filed: Sep. 10, 2018

(86) PCT No.: PCT/US2018/050243
§ 371 (c)(1),
(2) Date: May 16, 2019

(87) PCT Pub. No.: WO2019/190588
PCT Pub. Date: Oct. 3, 2019

(65) Prior Publication Data
US 2020/0259340 A1 Aug. 13, 2020

Related U.S. Application Data

(63) Continuation-in-part of application No. PCT/US2018/025424, filed on Mar. 30, 2018.

(51) Int. Cl.
*H02J 7/00* (2006.01)
*B60L 3/00* (2019.01)
(Continued)

(52) U.S. Cl.
CPC .......... *B60L 3/0046* (2013.01); *B60L 50/60* (2019.02); *F02N 11/12* (2013.01);
(Continued)

(58) Field of Classification Search
CPC .................................................. H02J 7/0016
See application file for complete search history.

(56) References Cited

U.S. PATENT DOCUMENTS

| | | |
|---|---|---|
| 5,189,359 A | 2/1993 | Kronberg |
| 5,635,817 A | 6/1997 | Shiska |
| 5,793,185 A | 8/1998 | Prelec |
| 5,795,182 A | 8/1998 | Jacob |
| 6,150,795 A | 11/2000 | Kutkut et al. |
| 6,212,054 B1 | 4/2001 | Chan |
| 6,292,492 B1 | 7/2001 | Bonomi et al. |

(Continued)

OTHER PUBLICATIONS

Texas Instruments, BQ40Z50 datasheet PDF, copyright 2013-2019 (Year: 2013).

*Primary Examiner* — Robert Grant
(74) *Attorney, Agent, or Firm* — Vorys, Sater, Seymour and Pease LLP; William L. Klima

(57) ABSTRACT

A portable or handheld device or apparatus for jump starting a vehicle engine having a depleted or discharged starting battery. The portable or handheld device or apparatus for jump starting a vehicle engine includes a rechargeable lithium-ion (Li-ion) battery pack and a battery cell equalization circuit configured to prevent overcharging of one or more individual lithium-ion battery cells, which can cause fire, damage to the battery pack and device or apparatus for jump starting a vehicle, or personal injury to a user.

16 Claims, 15 Drawing Sheets

(51) Int. Cl.
*H01M 10/0525* (2010.01)
*H01M 10/42* (2006.01)
*H01M 10/44* (2006.01)
*B60L 50/60* (2019.01)
*F02N 11/12* (2006.01)
*B60L 53/18* (2019.01)

(52) U.S. Cl.
CPC ..... *H01M 10/0525* (2013.01); *H01M 10/425* (2013.01); *H01M 10/441* (2013.01); *H02J 7/0016* (2013.01); *H02J 7/0021* (2013.01); *H02J 7/0029* (2013.01); *H02J 7/0047* (2013.01); *B60L 53/18* (2019.02); *H01M 2010/4271* (2013.01); *H01M 2220/30* (2013.01)

(56) References Cited

U.S. PATENT DOCUMENTS

| | | |
|---|---|---|
| 6,632,103 B1 | 10/2003 | Liu |
| 7,126,310 B1 | 10/2006 | Barron |
| 8,199,024 B2 | 6/2012 | Baxter |
| 8,493,021 B2 | 7/2013 | Richardson et al. |
| 9,007,015 B1 | 4/2015 | Nook et al. |
| 9,525,298 B1 * | 12/2016 | Pham ................ H02J 7/007 |
| 2008/0185996 A1 | 8/2008 | Krieger et al. |
| 2012/0074907 A1 | 3/2012 | Roeper |
| 2014/0225622 A1 | 8/2014 | Kudo et al. |
| 2015/0380952 A1 | 12/2015 | Brandt et al. |
| 2016/0329731 A1 | 11/2016 | Kokot, Jr. et al. |
| 2017/0012448 A1 * | 1/2017 | Miller ................ H02J 7/0047 |
| 2017/0110766 A1 | 4/2017 | Koebler |
| 2018/0345803 A1 | 12/2018 | Nook et al. |
| 2020/0259340 A1 | 8/2020 | Nook et al. |

* cited by examiner

PORTABLE OR HAND HELD VEHICLE BATTERY JUMP STARTING APPARATUS WITH BATTERY CELL EQUALIZATION CIRCUIT

RELATED APPLICATIONS

This PCT application claims priority to PCT/US18/25424 filed on Mar. 30, 2018, which is hereby incorporated by reference herein in its entirety.

FIELD

The present invention relates generally to an electronic device or apparatus having multiple batteries or a battery pack having multiple battery cells provided with a battery cell equalization circuit. For example, the apparatus is a portable vehicle battery jump starting apparatus for jump starting a vehicle having a depleted or discharged battery. The portable vehicle battery jump starting device comprises a battery pack having multiple individual battery cells and a battery cell equalization circuit.

BACKGROUND

Prior art devices are known, which provide either a pair of electrical connector cables that connect a fully-charged battery of another vehicle to the engine start circuit of the dead battery vehicle, or portable booster devices which include a fully-charged battery which can be connected in circuit with the vehicle's engine starter through a pair of cables.

Problems with the prior art apparatus arose when either the jumper terminals or clamps of the cables were inadvertently brought into contact with each other while the other ends were connected to or being power, or when the positive and negative jumper terminals or clamps were connected to the opposite polarity terminals in the vehicle to be jumped, thereby causing a short circuit resulting in sparking and potential damage to batteries and/or bodily injury. Various attempts to eliminate these problems have been made in the prior art.

U.S. Pat. No. 6,212,054 issued Apr. 3, 2001, discloses a battery booster pack that is polarity sensitive and can detect proper and improper connections before providing a path for electric current flow. The device uses a set of LEDs connected to optical couplers oriented by a control circuit. The control circuit controls a solenoid assembly controlling the path of power current. The control circuit causes power current to flow through the solenoid assembly only if the points of contact of booster cable clamp connections have been properly made.

U.S. Pat. No. 6,632,103 issued Oct. 14, 2003, discloses an adaptive booster cable connected with two pairs of clips, wherein the two pairs of clips are respectively attached to two batteries to transmit power from one battery to the other battery. The adaptive booster cable includes a polarity detecting unit connected to each clip, a switching unit and a current detecting unit both provided between the two pairs of clips. After the polarity of each clip is sensed by the polarity detecting unit, the switching unit generates a proper connection between the two batteries. Therefore, the positive and negative terminals of the two batteries are correctly connected based on the detected result of the polarity detecting unit.

U.S. Pat. No. 8,493,021 issued Jul. 23, 2013, discloses apparatus that monitors the voltage of the battery of a vehicle to be jump started and the current delivered by the jump starter batteries to determine if a proper connection has been established and to provide fault monitoring. Only if the proper polarity is detected can the system operate. The voltage is monitored to determine open circuit, disconnected conductive clamps, shunt cable fault, and solenoid fault conditions. The current through the shunt cable is monitored to determine if there is a battery explosion risk, and for excessive current conditions presenting an overheating condition, which may result in fire. The system includes an internal battery to provide the power to the battery of the vehicle to be jump started. Once the vehicle is started, the unit automatically electrically disconnects from the vehicle's battery.

U.S. Pat. No. 5,189,359 issued Feb. 23, 1993, discloses a jumper cable device having two bridge rectifiers for developing a reference voltage, a four-input decoder for determining which terminals are to be connected based on a comparison of the voltage at each of the four terminals to the reference voltage, and a pair of relays for effecting the correct connection depending on the determination of the decoder. No connection will be made unless only one terminal of each battery has a higher voltage than the reference voltage, indicating "positive" terminals, and one has a lower voltage than the reference voltage, indicating "negative" terminals, and that, therefore, the two high voltage terminals may be connected and the two lower voltage terminals may be connected. Current flows once the appropriate relay device is closed. The relay device is preferably a MOSFET combined with a series array of photodiodes that develop MOSFET gate-closing potential when the decoder output causes an LED to light.

U.S. Pat. No. 5,795,182 issued Aug. 18, 1998, discloses a polarity independent set of battery jumper cables for jumping a first battery to a second battery. The apparatus includes a relative polarity detector for detecting whether two batteries are configured cross or parallel. A three-position high current capacity crossbar pivot switch is responsive to the relative polarity detector for automatically connecting the plus terminals of the two batteries together and the minus terminals of the two batteries together regardless of whether the configuration detected is cross or parallel, and an undercurrent detector and a delay circuit for returning the device to its ready and unconnected state after the device has been disconnected from one of the batteries. The crossbar pivot switch includes two pairs of contacts, and a pivot arm that pivots about two separate points to ensure full electrical contact between the pairs of contacts.

The present invention can also be used to produce a battery charger that may be connected to a battery without regard to the polarity of the battery.

U.S. Pat. No. 6,262,492 issued Jul. 17, 2001, discloses a car battery jumper cable for accurately coupling an effective power source to a failed or not charged battery, which includes a relay switching circuit connected to the power source and the battery by two current conductor pairs. First and second voltage polarity recognition circuits are respectively connected to the power source and the battery by a respective voltage conductor pair to recognize the polarity of the power source and the battery. A logic recognition circuit produces a control signal subject to the polarity of the power source and the battery, and a driving circuit controlled by the control signal from the logic recognition circuit drives the relay switching circuit, enabling the two poles of the power source to be accurately coupled to the two poles of the battery.

U.S. Pat. No. 5,635,817 issued Jun. 3, 1997, discloses a vehicle battery charging device that includes a control housing having cables including a current limiting device to prevent exceeding of a predetermined maximum charging current of about 40 to 60 amps. The control housing includes a polarity detecting device to verify the correct polarity of the connection of the terminals of the two batteries and to electrically disconnect the two batteries if there is an incorrect polarity.

U.S. Pat. No. 8,199,024 issued Jun. 12, 2012, discloses a safety circuit in a low-voltage connecting system that leaves the two low-voltage systems disconnected until it determines that it is safe to make a connection. When the safety circuit determines that no unsafe conditions exist and that it is safe to connect the two low-voltage systems, the safety circuit may connect the two systems by way of a "soft start" that provides a connection between the two systems over a period of time that reduces or prevents inductive voltage spikes on one or more of the low-voltage systems. When one of the low-voltage systems has a completely-discharged battery incorporated into it, a method is used for detection of proper polarity of the connections between the low-voltage systems. The polarity of the discharged battery is determined by passing one or more test currents through it and determining whether a corresponding voltage rise is observed.

U.S. Pat. No. 5,793,185 issued Aug. 11, 1998, discloses a hand-held jump starter having control components and circuits to prevent overcharging and incorrect connection to batteries.

Further, there exists a problem with the prior art electronic devices or apparatus having multiple batteries or a battery pack with multiple battery cells.

For example, lithium-ion (Li-ion) batteries have been known to explode or catch fire due to overheating when individual battery cells get overcharged. The battery life also decreases, if individual battery cells are not equally charged, causing significantly unequal voltages across the individual battery cells.

Currently, portable or hand-held vehicle jump starters using Li-ion batteries do not include battery equalization circuits. Thus, Li-ion batteries can suffer from the above overcharging problems. An example of such a hand-held vehicle jump starter is disclosed in U.S. Pat. No. 9,007,015, which is incorporated herein by reference.

A battery cell equalization circuit according to the present invention can be applied or incorporated into the portable or hand-held vehicle jump starter device disclosed and claimed in U.S. Pat. No. 9,007,015.

There exists a need to provide battery equalization circuits, for example, with electronic apparatus having multiple Li-ion batteries or Li-ion battery packs having multiple battery cells, for example, in rechargeable electronic devices such as the portable or hand-held vehicle jump starter device according to the present invention.

While the prior art attempted to provide solutions to one or more of the above-mentioned problem(s) as discussed above, each of the prior art solutions suffers from other shortcomings, either in complexity, cost and/or has potential for malfunction. Accordingly, there exists a need in the art for further improvements to electronic devices or apparatus having multiple batteries or battery packs having multiple battery cells such as used in vehicle jump starting devices or apparatus.

SUMMARY

In accordance with an aspect of the invention, an electronic device or apparatus is provided for jump starting a vehicle engine, including: an internal power supply; an output port having positive and negative polarity outputs; a vehicle battery isolation sensor connected in circuit with the positive and negative polarity outputs, configured to detect presence of a vehicle battery connected between the positive and negative polarity outputs; a reverse polarity sensor connected in circuit with the positive and negative polarity outputs, configured to detect polarity of a vehicle battery connected between the positive and negative polarity outputs; a power FET switch connected between the internal power supply and the output port; and a microcontroller configured to receive input signals from the vehicle isolation sensor and the reverse polarity sensor, and to provide an output signal to the power FET switch, such that the power FET switch is turned on to connect the internal power supply to the output port in response to signals from the sensors indicating the presence of a vehicle battery at the output port and proper polarity connection of positive and negative terminals of the vehicle battery with the positive and negative polarity outputs.

In accordance with another aspect of the invention, the internal power supply is a rechargeable lithium-ion (Li-ion) battery pack.

In accordance with yet another aspect of the invention, a jumper cable device is provided with a plug configured to plug into an output port of a handheld battery charger booster device having an internal power supply; a pair of cables integrated with the plug at one respective end thereof; the pair of cables being configured to be separately connected to terminals of a battery at another respective end thereof.

The present invention also provides a battery cell equalization circuit for an electronic device or apparatus having multiple battery cells (e.g. Li-ion batteries) or a battery pack having multiple battery cells (e.g. Li-ion battery cells). For example, the batteries or battery pack can comprise or consist of multiple batteries connected to a battery cell equalization circuit. The battery cell equalization circuit (e.g. circuit board) can be packaged internally with the batteries or battery pack, or can be an electronic circuit or component separate from the battery pack installed in the electronic device or apparatus powered by the battery pack (e.g. circuit board within electronic device, but not packaged with battery pack). The batteries or battery packs can be rechargeable using lithium-ion, nickel cadmium, or rechargeable batteries or battery cells.

The battery cell equalization circuit according to the present invention, for example, can be applied or implemented in a rechargeable electronic device or apparatus such as a tool, portable or hand-held vehicle jump starter, vehicle, electrical vehicle (e.g. electric car, electric truck, electric bus, electric golf cart, electric utility cart, motorcycle, mini bike, scooter, go kart), radio, electronic player, radio controlled device, radio controlled toy (e.g. R/C airplane, R/C boat, R/C car, R/C truck), game, or other numerous other rechargeable electronic devices, apparatus, or applications.

The battery cell equalization circuit can be applied to or used in a portable or hand-held jump starter. This type of electronic device conveys a significant amount of energy or power from the rechargeable batteries or battery pack to a deplete or discharged battery being jump started in a short amount of time requiring the batteries or batter cells to all be fully charged and balanced.

The battery cell equalization circuit according to the present invention can be configured to be simple, safe, effective, low cost, and can include a controllable mechanism to enable or disable itself from trying to sense the cell voltages and trying to equalize them.

DETAILED DESCRIPTION OF PREFERRED EMBODIMENTS

Figure 1:
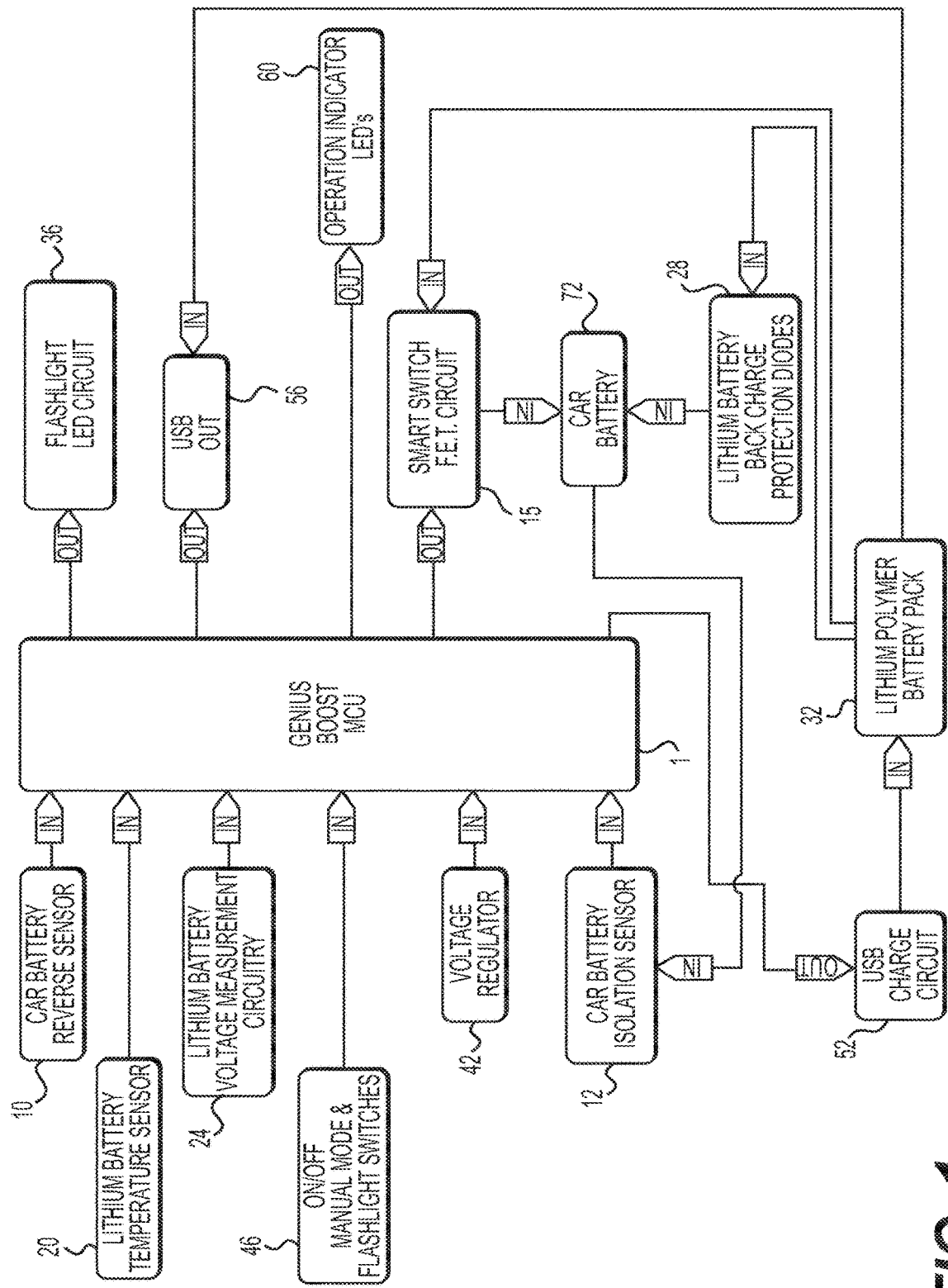
FIG. 1 is a functional block diagram of a handheld vehicle battery boost apparatus in accordance with one aspect of the present invention.

FIG. 1 is a functional block diagram of a handheld battery booster according to one aspect of the invention. At the heart of the handheld battery booster is a lithium polymer battery pack 32, which stores sufficient energy to jump start a vehicle engine served by a conventional 12 volt lead-acid or valve regulated lead-acid battery. In one example embodiment, a high-surge lithium polymer battery pack includes three 3.7 V, 2666 mAh lithium polymer batteries in a 351P configuration. The resulting battery pack provides 11.1 V, 2666 Ah (8000 Ah at 3.7 V, 29.6 Wh). Continuous discharge current is 25 C (or 200 amps), and burst discharge current is 50 C (or 400 amps). The maximum charging current of the battery pack is 8000 mA (8 amps).

A programmable microcontroller unit (MCU) 1 receives various inputs and produces informational as well as control outputs. The programmable MCU 1 further provides flexibility to the system by allowing updates in functionality and system parameters, without requiring any change in hardware. According to one example embodiment, an 8 bit microcontroller with 2 K.times.15 bits of flash memory is used to control the system. One such microcontroller is the HT67F30, which is commercially available from Holtek Semiconductor Inc.

A car battery reverse sensor 10 monitors the polarity of the vehicle battery 72 when the handheld battery booster device is connected to the vehicle's electric system. As explained below, the booster device prevents the lithium battery pack from being connected to the vehicle battery 72 when the terminals of the battery 72 are connected to the wrong terminals of the booster device. A car battery isolation sensor 12 detects whether or not a vehicle battery 72 is connected to the booster device, and prevents the lithium battery pack from being connected to the output terminals of the booster device unless there is a good (e.g. chargeable) battery connected to the output terminals.

A smart switch FET circuit 15 electrically switches the handheld battery booster lithium battery to the vehicle's electric system only when the vehicle battery is determined by the MCU 1 to be present (in response to a detection signal provided by isolation sensor 12) and connected with the correct polarity (in response to a detection signal provided by reverse sensor 10). A lithium battery temperature sensor 20 monitors the temperature of the lithium battery pack 32 to detect overheating due to high ambient temperature conditions and overextended current draw during jump starting. A lithium battery voltage measurement circuit 24 monitors the voltage of the lithium battery pack 32 to prevent the voltage potential from rising too high during a charging operation and from dropping too low during a discharge operation.

Lithium-ion battery back-charge protection diodes 28 prevent any charge current being delivered to the vehicle battery 72 from flowing back to the lithium battery pack 32 from the vehicle's electrical system. Flashlight LED circuit 36 is provided to furnish a flashlight function for enhancing light under a vehicle's hood in dark conditions, as well as providing SOS and strobe lighting functions for safety purposes when a vehicle may be disabled in a potentially dangerous location. Voltage regulator 42 provides regulation of internal operating voltage for the microcontroller and sensors. On/Off manual mode and flashlight switches 46 allow the user to control power-on for the handheld battery booster device, to control manual override operation if the vehicle has no battery, and to control the flashlight function. The manual button functions only when the booster device is powered on. This button allows the user to jump-start vehicles that have either a missing battery, or the battery voltage is so low that automatic detection by the MCU is not possible. When the user presses and holds the manual override button for a predetermined period time (such as three seconds) to prevent inadvertent actuation of the manual mode, the internal lithium ion battery power is switched to the vehicle battery connect port. The only exception to the manual override is if the car battery is connected in reverse. If the car battery is connected in reverse, the internal lithium battery power shall never be switched to the vehicle battery connect port.

USB charge circuit 52 converts power from any USB charger power source, to charge voltage and current for charging the lithium battery pack 32. USB output 56 provides a USB portable charger for charging smartphones, tablets, and other rechargeable electronic devices. Operation indicator LEDs 60 provide visual indication of lithium battery capacity status as well as an indication of smart switch activation status (indicating that power is being provided to the vehicle's electrical system).

Figure 2A:
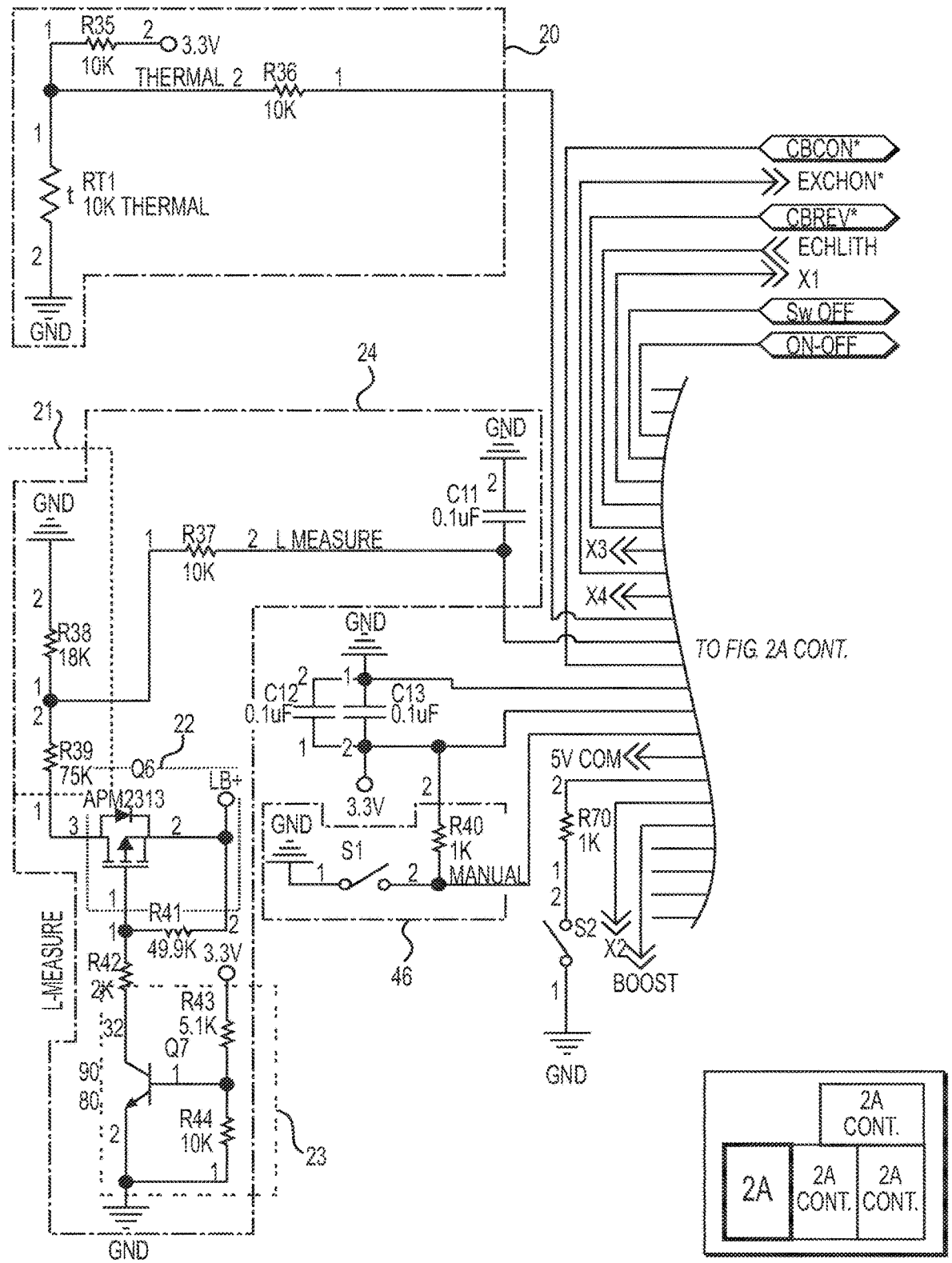
FIGS. 2A-2C are schematic circuit diagrams of an example embodiment of a handheld vehicle battery boost apparatus in accordance with an aspect of the invention.
Figure 2A:
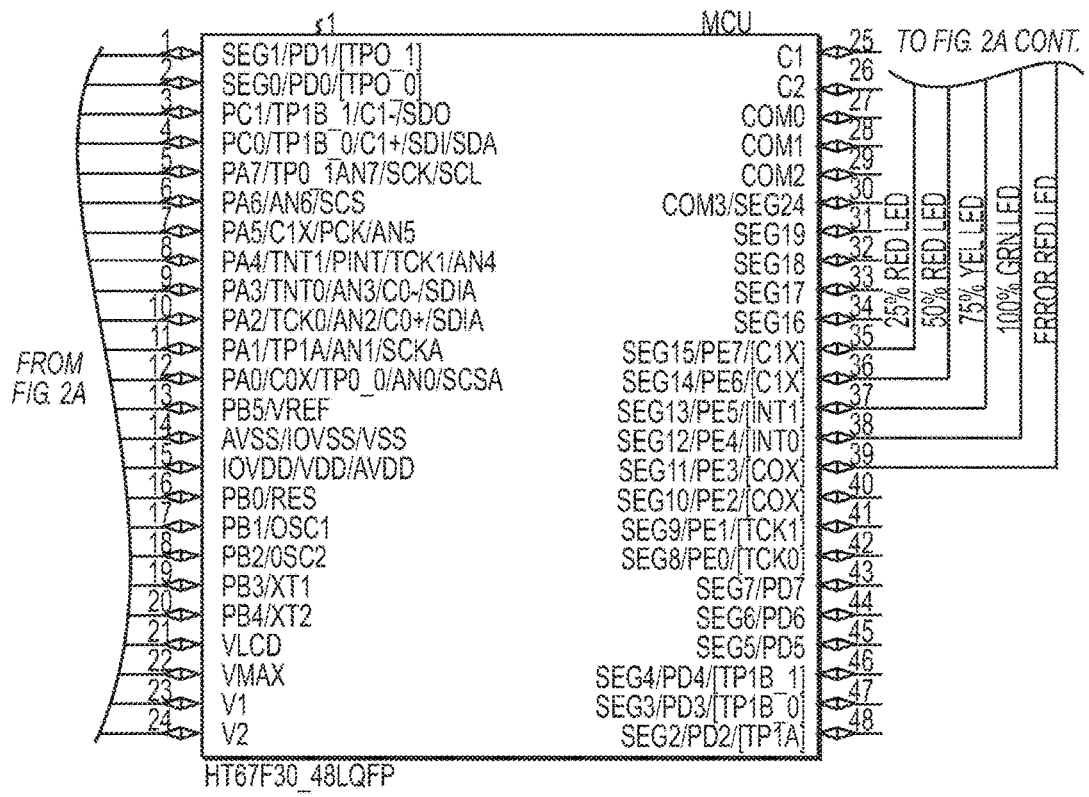
Figure 2A:
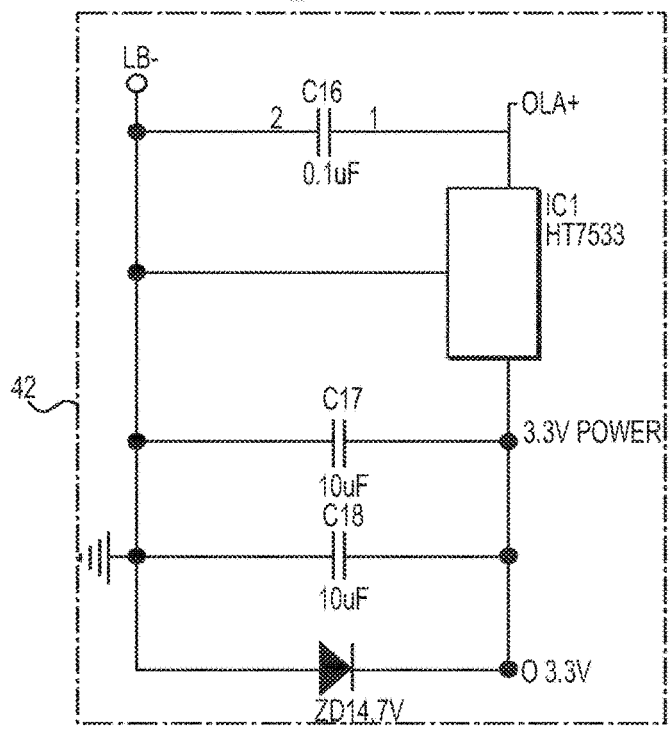
Figure 2A:
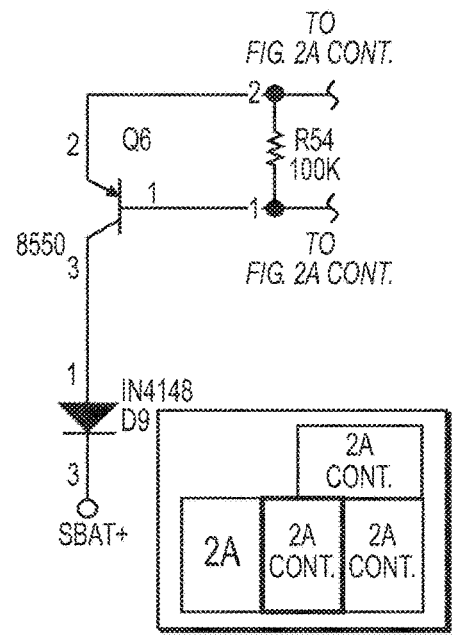
Figure 2A:
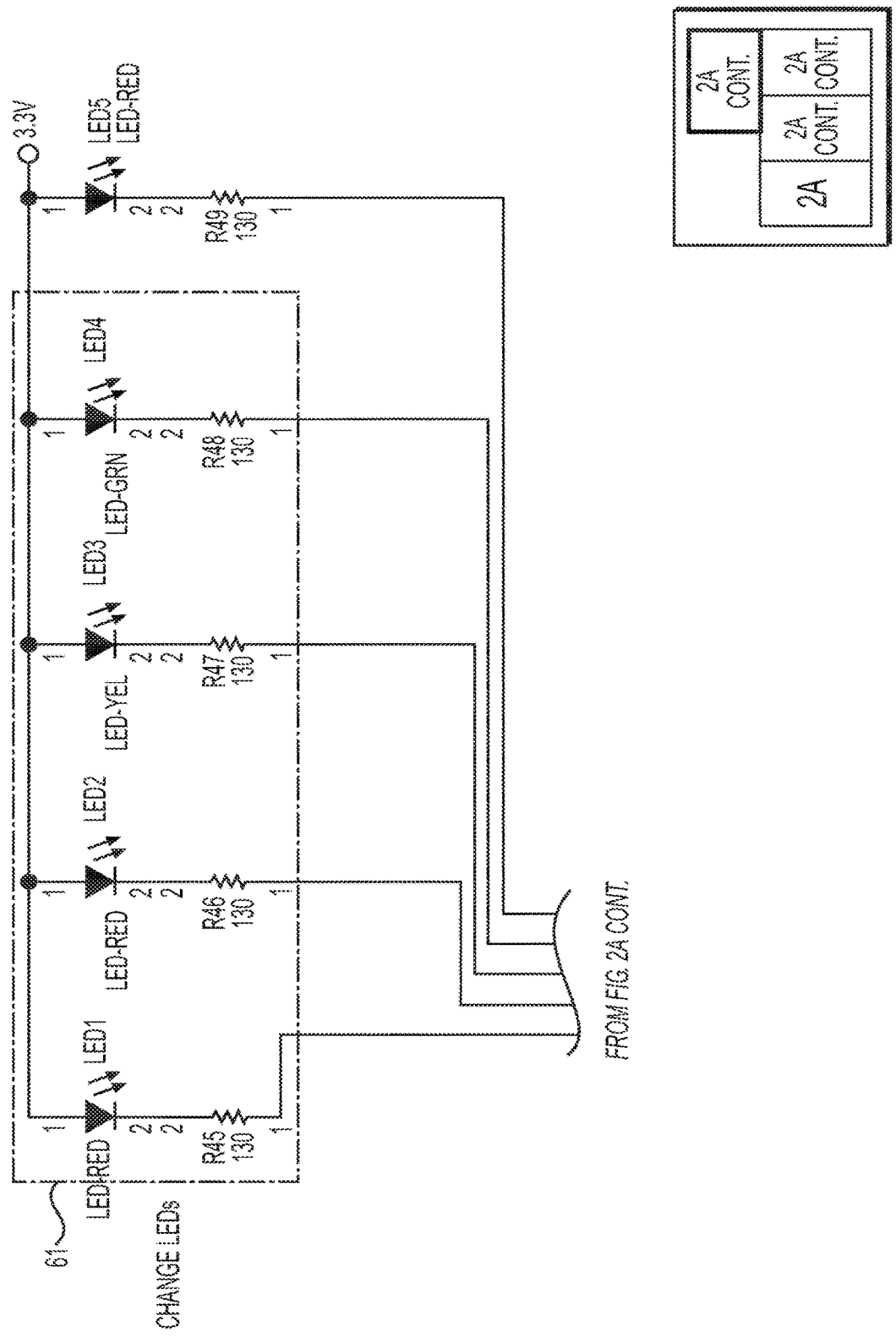
Figure 2A:
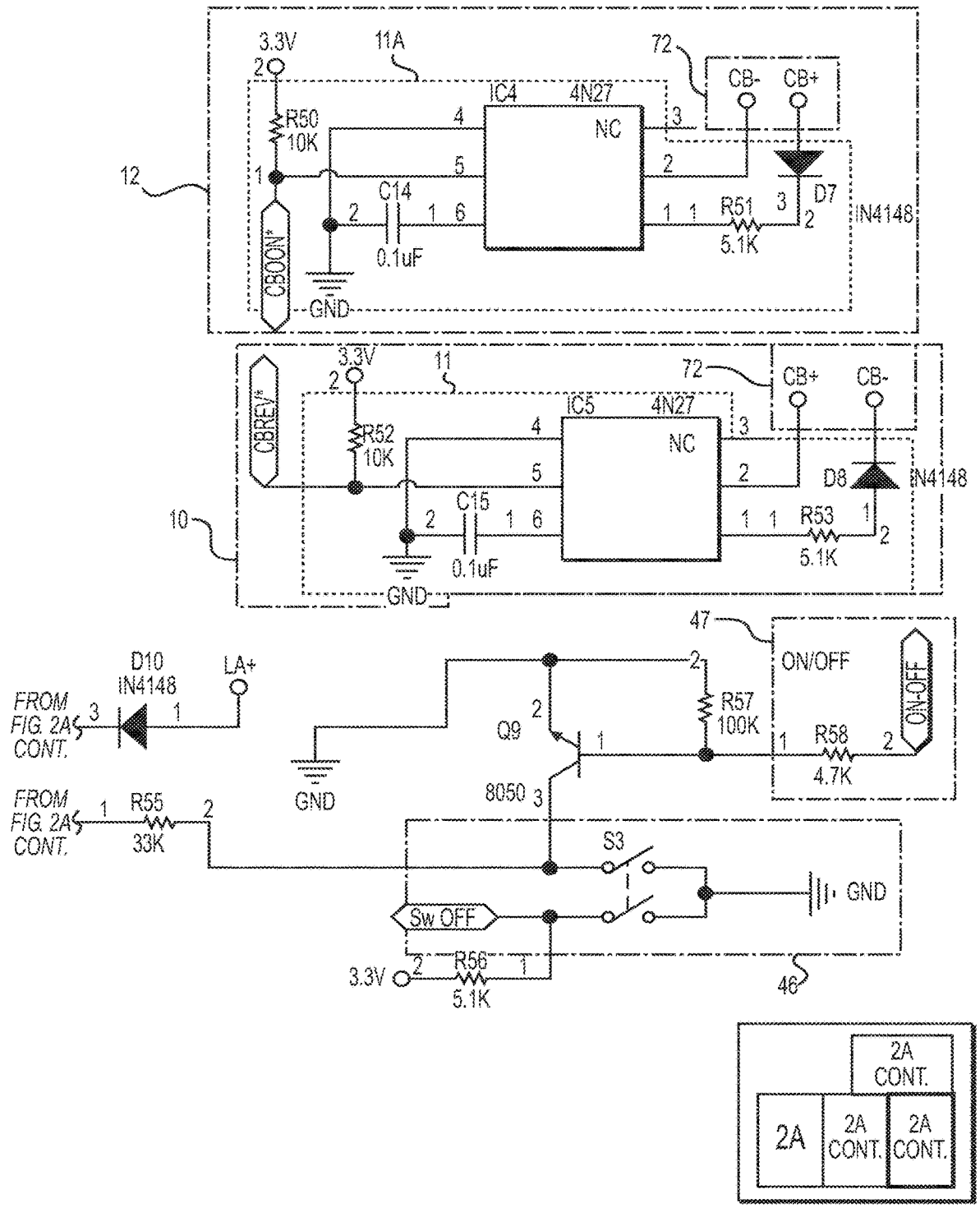

Detailed operation of the handheld booster device will now be described with reference to the schematic diagrams of FIGS. 2A-2C. As shown in FIG. 2A, the microcontroller unit 1 is the center of all inputs and outputs. The reverse battery sensor 10 comprises an optically coupled isolator phototransistor (4N27) connected to the terminals of vehicle battery 72 at input pins 1 and 2 with a diode D8 in the lead conductor of pin 1 (associated with the negative terminal CB−), such that if the battery 72 is connected to the terminals of the booster device with the correct polarity, the optocoupler LED 11 will not conduct current, and is therefore turned off, providing a "1" or high output signal to the MCU 1. The car battery isolation sensor 12 comprises an optically coupled isolator phototransistor (4N27) connected to the terminals of vehicle battery 72 at input pins 1 and 2 with a diode D7 in the lead conductor of pin 1 (associated with the positive terminal CB+), such that if the battery 72 is connected to the terminals of the booster device with the correct polarity, the optocoupler LED 11A will conduct current, and is therefore turned on, providing a "0" or low output signal to the MCU, indicating the presence of a battery across the jumper output terminals of the handheld booster device.

If the car battery 72 is connected to the handheld booster device with reverse polarity, the optocoupler LED 11 of the reverse sensor 10 will conduct current, providing a "0" or low signal to microcontroller unit 1. Further, if no battery is connected to the handheld booster device, the optocoupler LED 11A of the isolation sensor 12 will not conduct current, and is therefore turned off, providing a "1" or high output signal to the MCU, indicating the absence of any battery connected to the handheld booster device. Using these specific inputs, the microcontroller software of MCU 1 can determine when it is safe to turn on the smart switch FET 15, thereby connecting the lithium battery pack to the jumper terminals of the booster device. Consequently, if the car battery 72 either is not connected to the booster device at all, or is connected with reverse polarity, the MCU 1 can keep the smart switch FET 15 from being turned on, thus prevent sparking/short circuiting of the lithium battery pack.

Figure 2B:
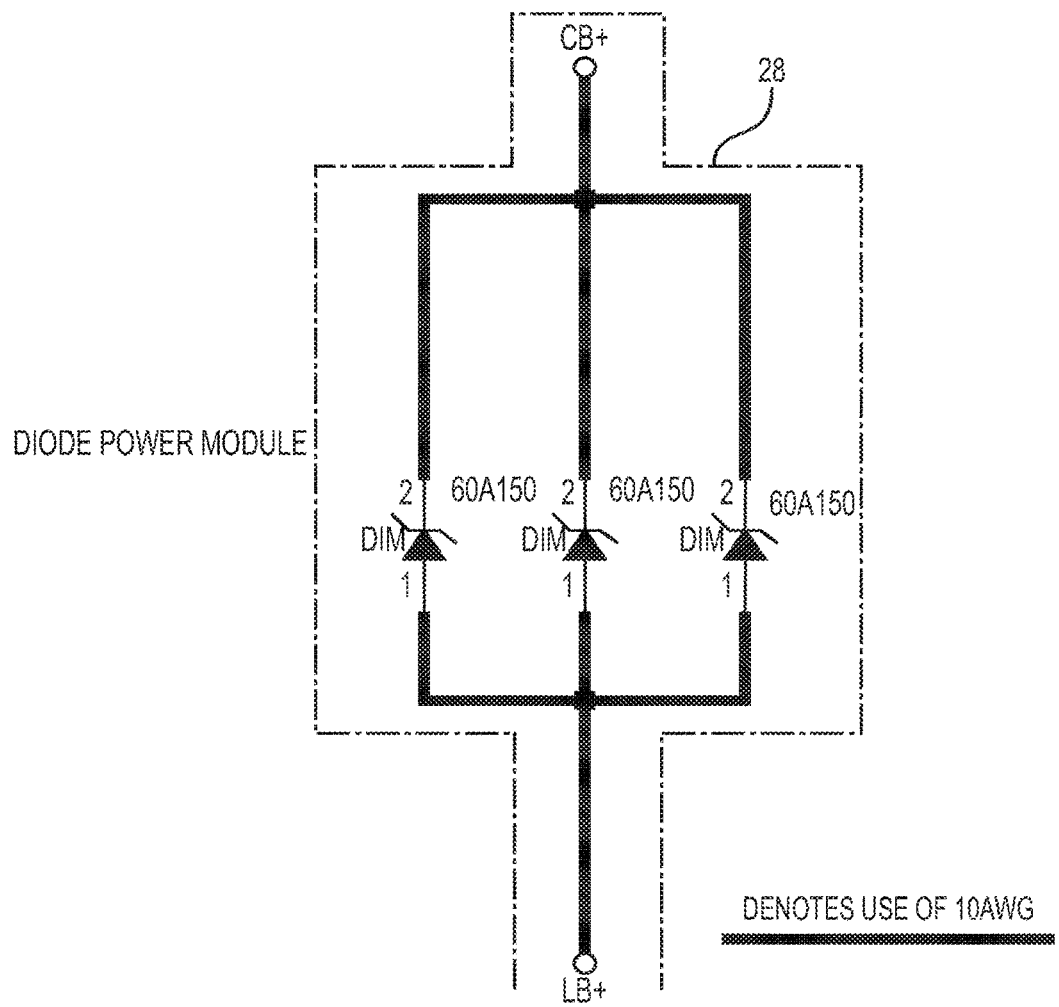
Figure 2B:
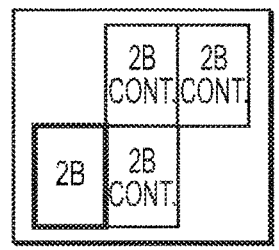
Figure 2B:
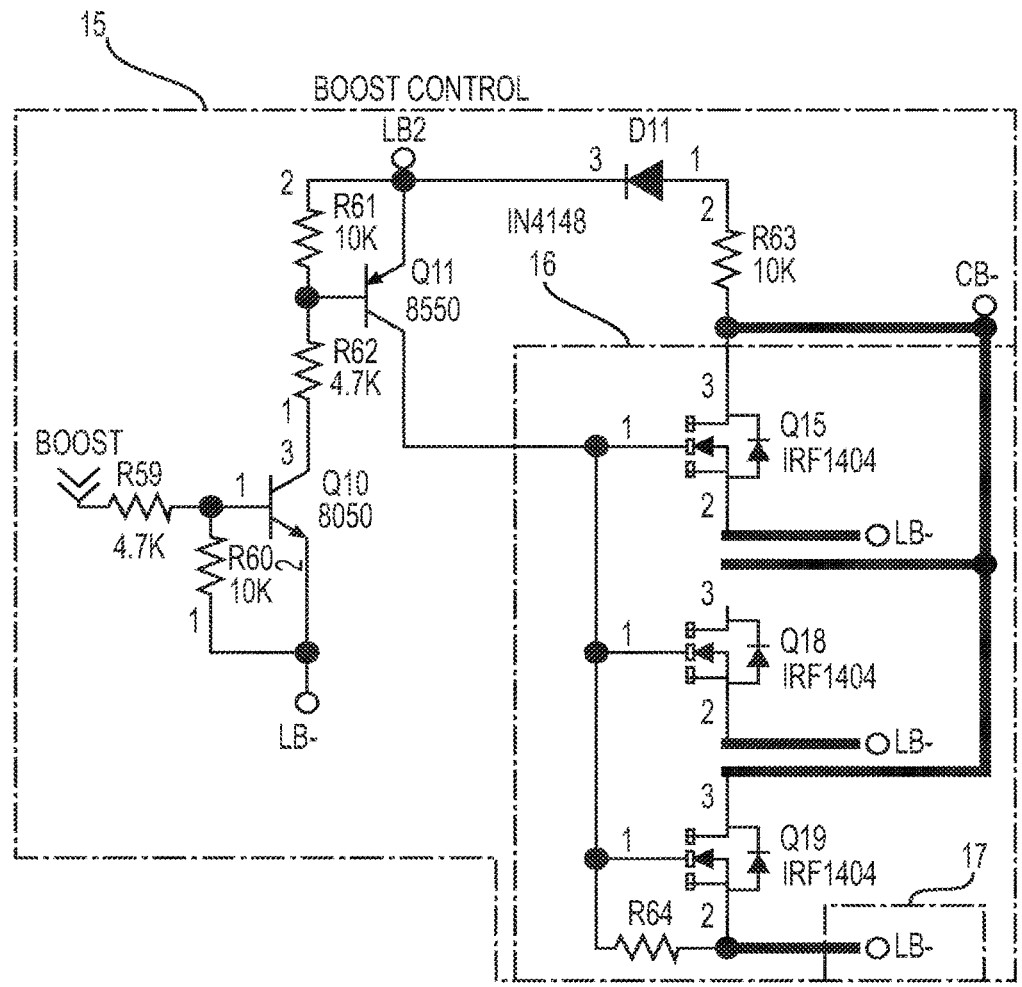
Figure 2B:
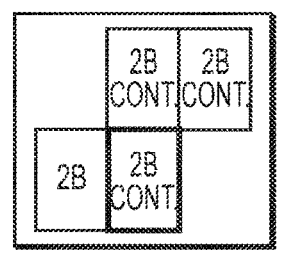
Figure 2B:
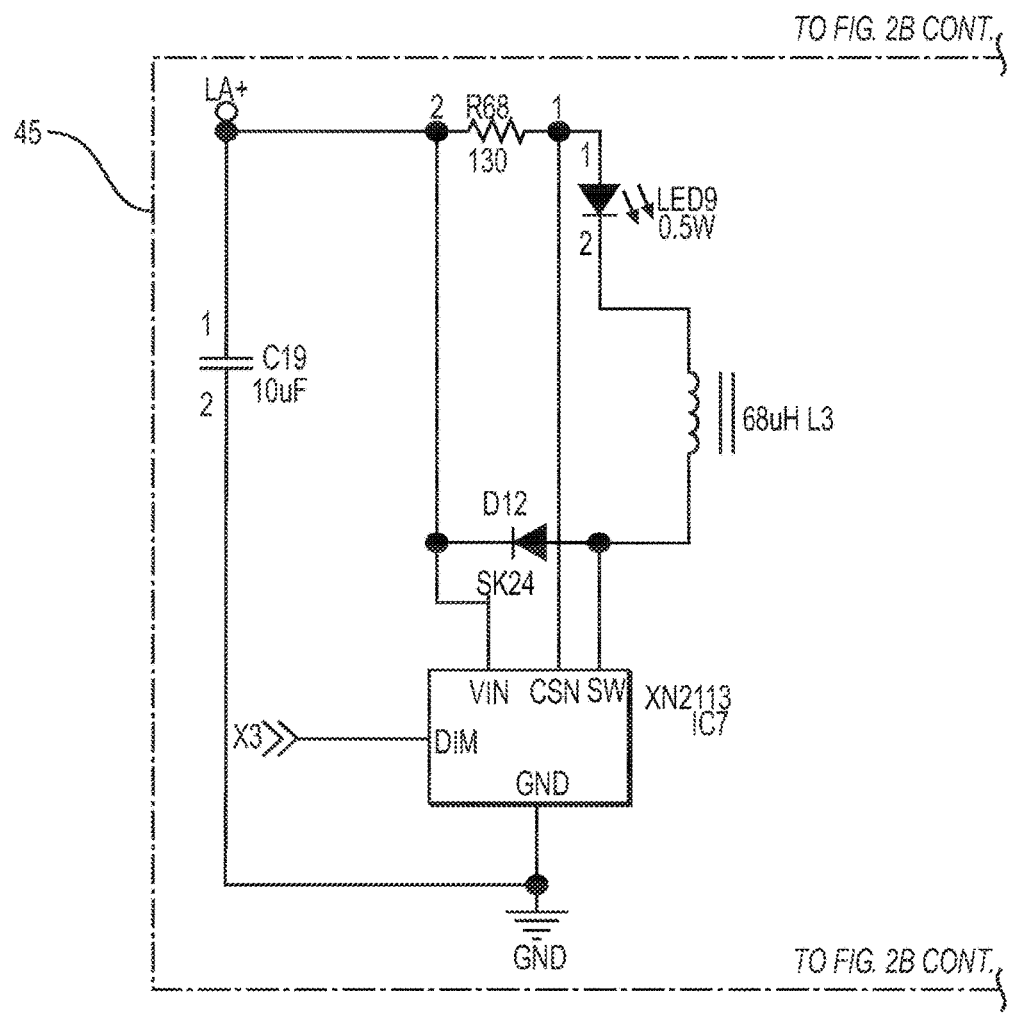
Figure 2B:
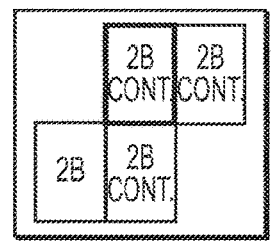
Figure 2B:
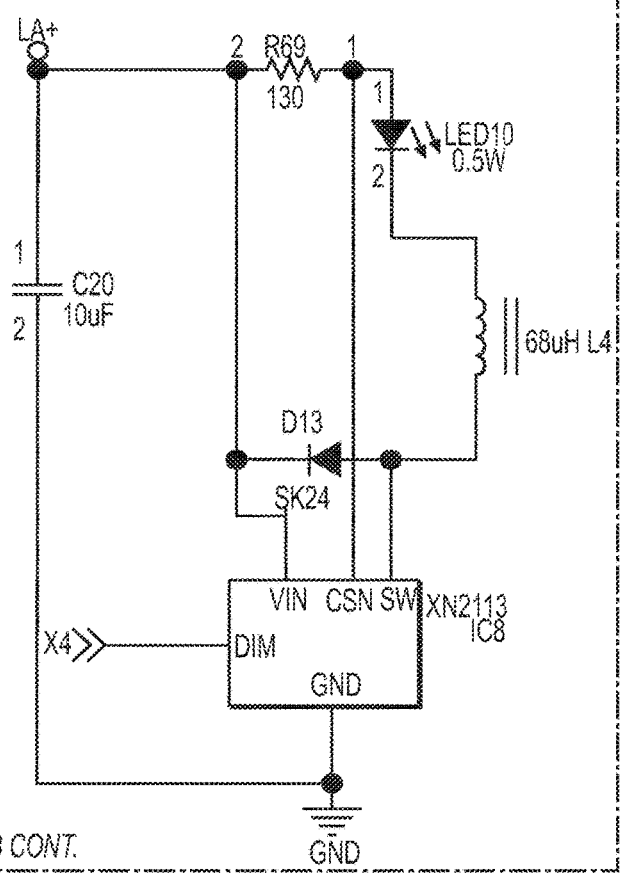
Figure 2B:
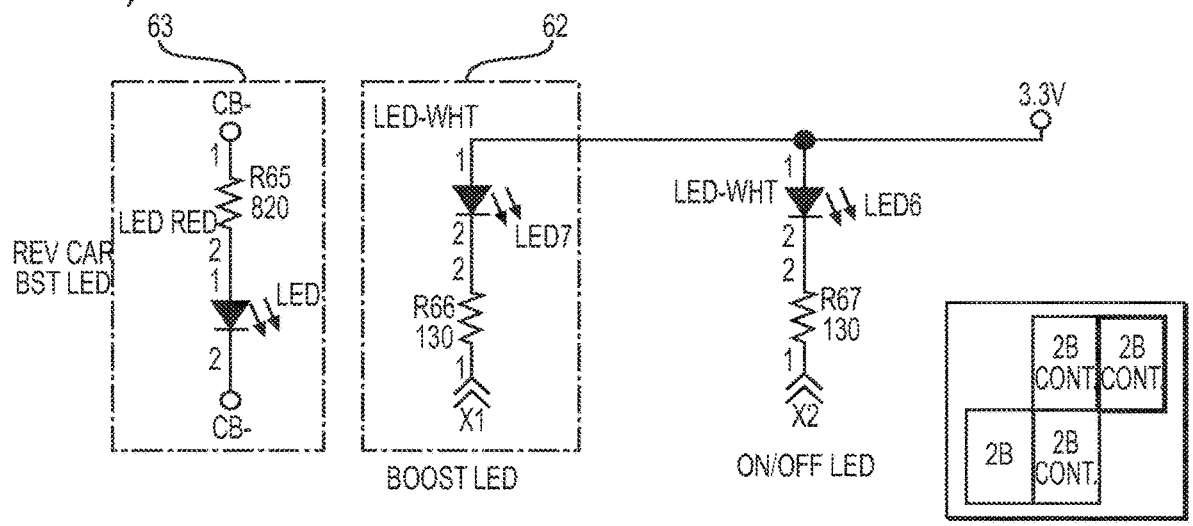

As shown in FIG. 2B, the FET smart switch 15 is driven by an output of the microcontroller 1. The FET smart switch 15 includes three FETs (Q15, Q18, and Q19) in parallel, which spreads the distribution of power from the lithium battery pack over the FETs. When that microcontroller output is driven to a logic low, FETs 16 are all in a high resistance state, therefore not allowing current to flow from the internal lithium battery negative contact 17 to the car battery 72 negative contact. When the micro controller output is driven to a logic high, the FETs 16 (Q15, Q18, and Q19) are in a low resistant state, allowing current to flow freely from the internal lithium battery pack negative contact 17 (LB−) to the car battery 72 negative contact (CB−). In this way, the microcontroller software controls the connection of the internal lithium battery pack 32 to the vehicle battery 72 for jumpstarting the car engine.

Referring back to FIG. 2A, the internal lithium battery pack voltage can be accurately measured using circuit 24 and one of the analog-to-digital inputs of the microcontroller 1. Circuit 24 is designed to sense when the main 3.3 V regulator 42 voltage is on, and to turn on transistor 23 when the voltage of regulator 42 is on. When transistor 23 is conducting, it turns on FET 22, thereby providing positive contact (LB+) of the internal lithium battery a conductive path to voltage divider 21 allowing a lower voltage range to be brought to the microcontroller to be read. Using this input, the microcontroller software can determine if the lithium battery voltage is too low during discharge operation or too high during charge operation, and take appropriate action to prevent damage to electronic components.

Still referring to FIG. 2A, the temperature of the internal lithium battery pack 32 can be accurately measured by two negative temperature coefficient (NTC) devices 20. These are devices that reduce their resistance when their temperature rises. The circuit is a voltage divider that brings the result to two analog-to-digital (A/D) inputs on the microcontroller 1. The microcontroller software can then determine when the internal lithium battery is too hot to allow jumpstarting, adding safety to the design.

The main voltage regulator circuit 42 is designed to convert internal lithium battery voltage to a regulated 3.3 volts that is utilized by the microcontroller 1 as well as by other components of the booster device for internal operating power. Three lithium battery back charge protection diodes 28 (see FIG. 2) are in place to allow current to flow only from the internal lithium battery pack 32 to the car battery 72, and not from the car battery to the internal lithium battery. In this way, if the car electrical system is charging from its alternator, it cannot back-charge (and thereby damage) the internal lithium battery, providing another level of safety. The main power on switch 46 (FIG. 2A) is a combination that allows for double pole, double throw operation so that with one push, the product can be turned on if it is in the off state, or turned off if it is in the on state. This circuit also uses a microcontroller output 47 to "keep alive" the power when it is activated by the on switch. When the switch is pressed the microcontroller turns this output to a high logic level to keep power on when the switch is released. In this way, the microcontroller maintains control of when the power is turned off when the on/off switch is activated again or when the lithium battery voltage is getting too low. The microcontroller software also includes a timer that turns the power off after a predefined period of time, (such as, e.g. 8 hours) if not used.

The flashlight LED circuit 45 shown in FIG. 2B controls the operation of flashlight LEDs. Two outputs from the microcontroller 1 are dedicated to two separate LEDs. Thus, the LEDs can be independently software-controlled for strobe and SOS patterns, providing yet another safety feature to the booster device. LED indicators provide the feedback the operator needs to understand what is happening with the product. Four separate LEDs 61 (FIG. 2A) are controlled by corresponding individual outputs of microcontroller 1 to provide indication of the remaining capacity of the internal lithium battery. These LEDs are controlled in a "fuel gauge" type format with 25%, 50%, 75% and 100% (red, red, yellow, green) capacity indications. An LED indicator 63 (FIG. 2B) provides a visual warning to the user when the vehicle battery 72 has been connected in reverse polarity. "Boost" and on/off LEDs 62 provide visual indications when the booster device is provide jump-start power, and when the booster device is turned on, respectively.

Figure 2C:
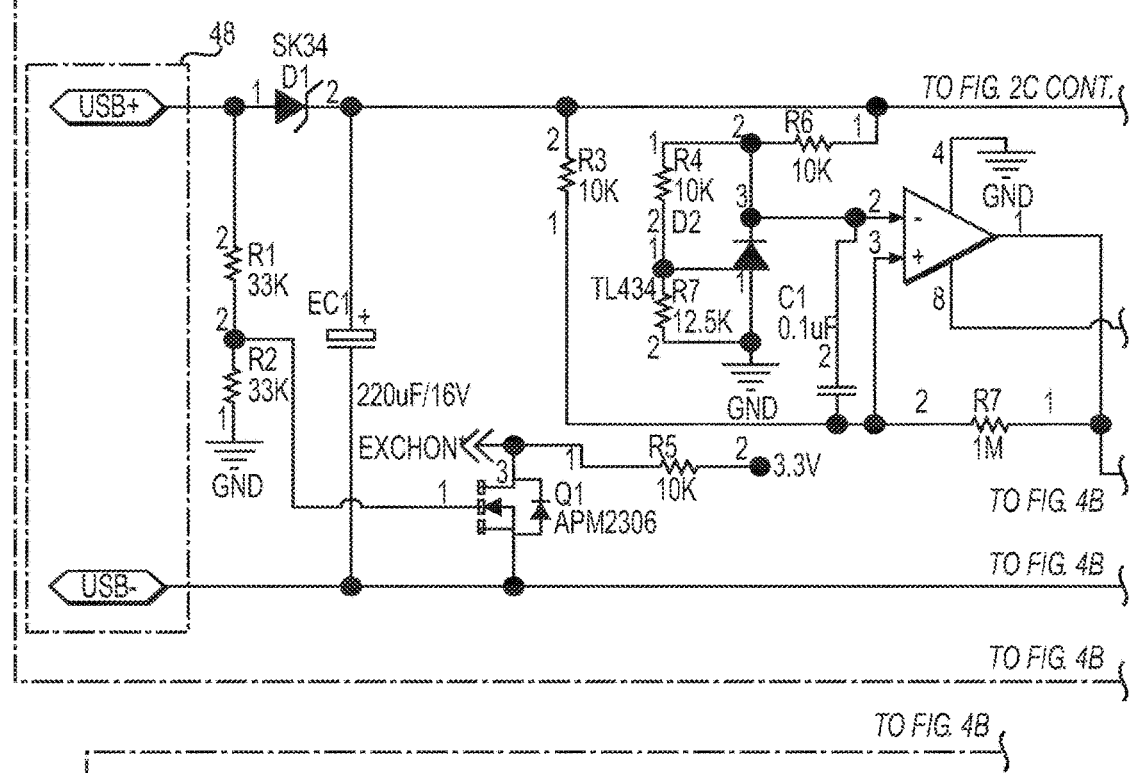
Figure 2C:
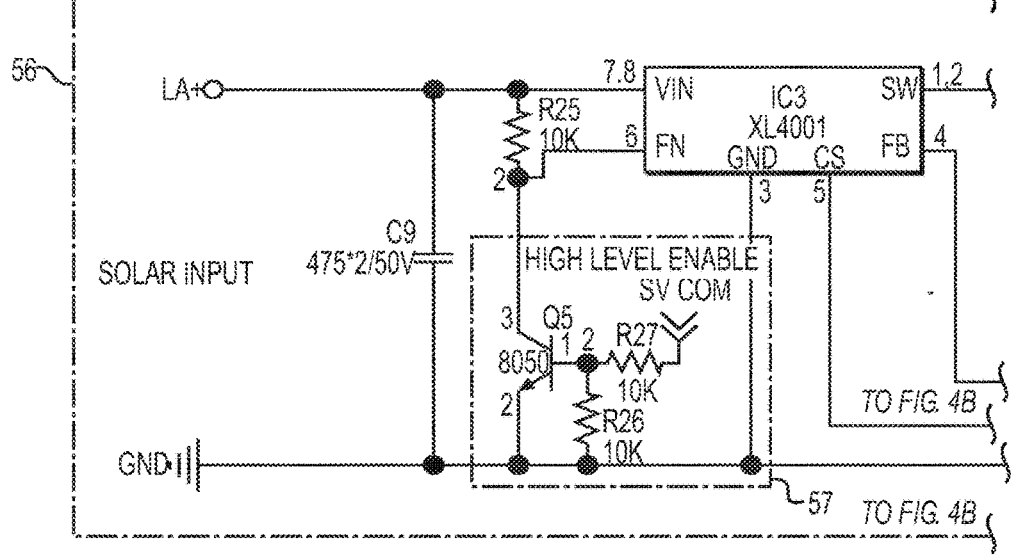
Figure 2C:
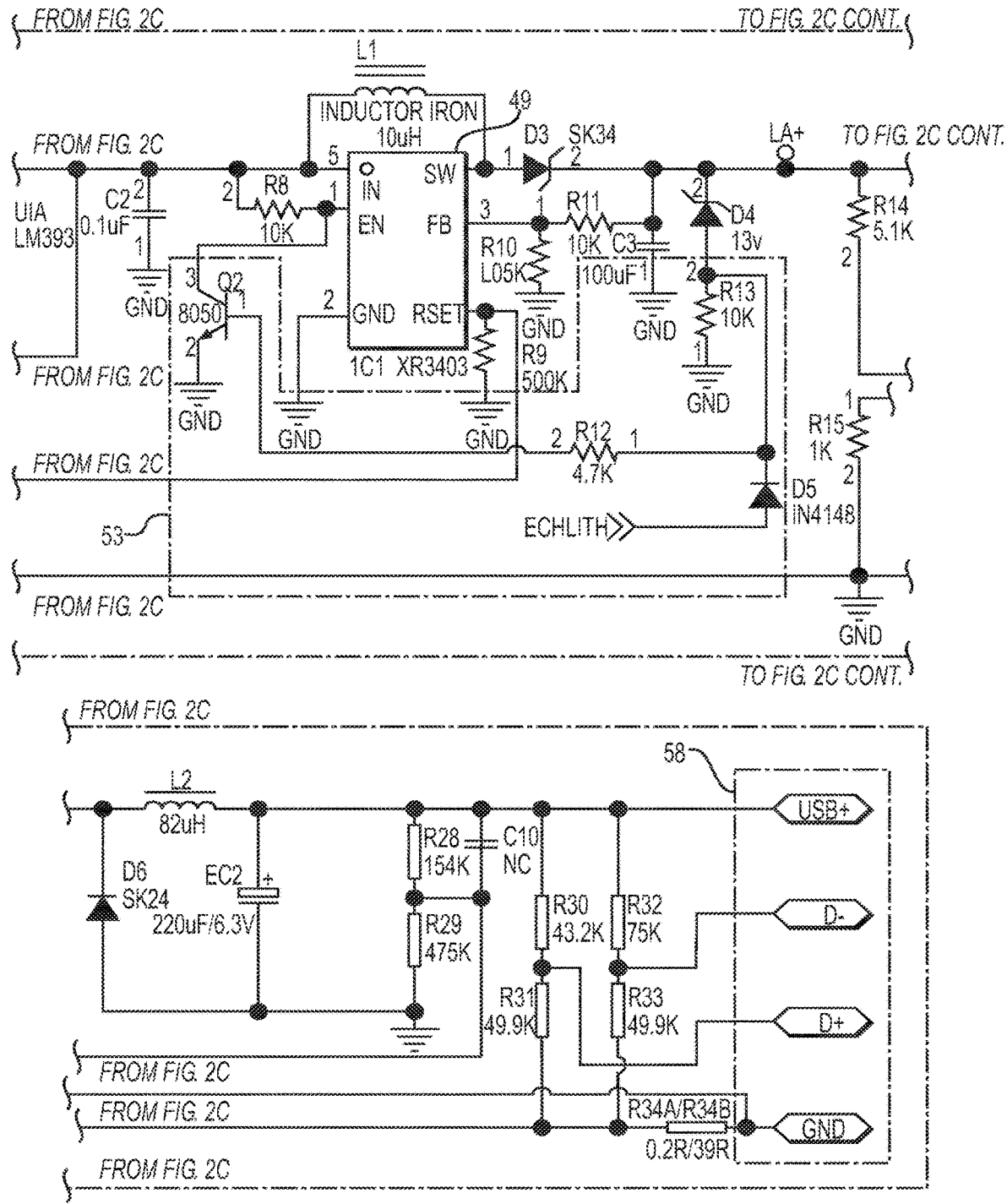
Figure 2C:
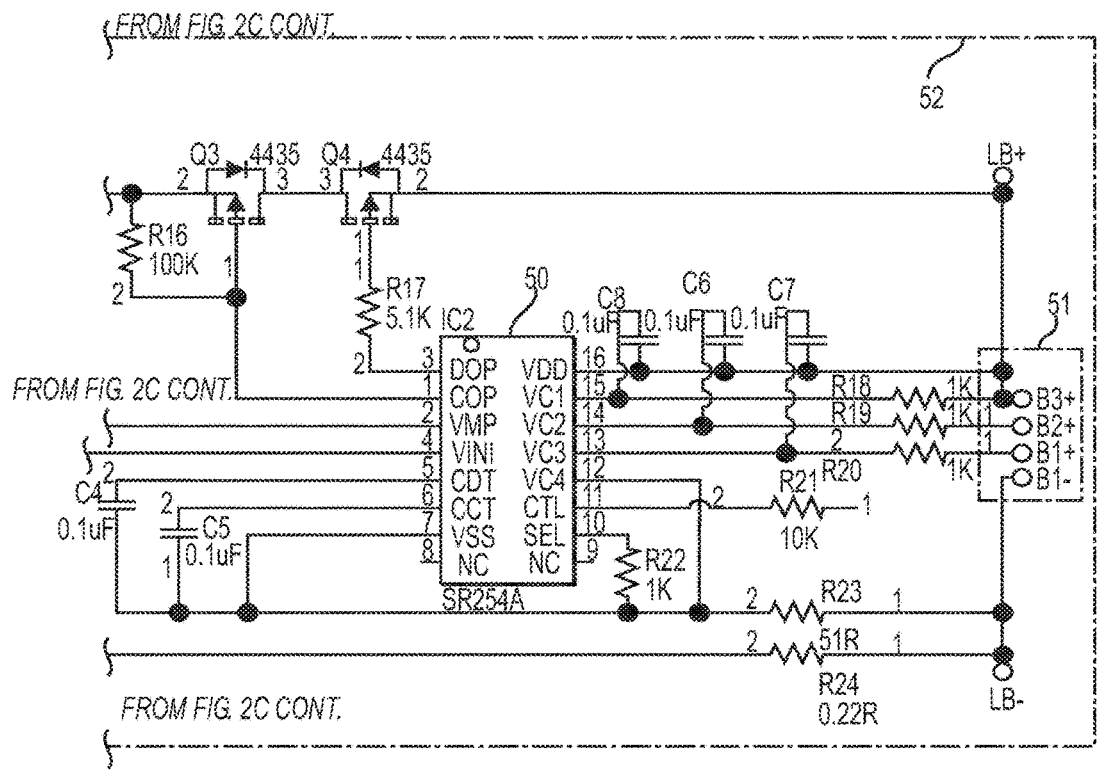
Figure 2C:
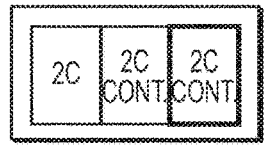

A USB output 56 circuit, as shown in FIG. 2C is included to provide a USB output for charging portable electronic devices such as smartphones from the internal lithium battery pack 32. Control circuit 57 from the microcontroller 1 allows the USB Out 56 to be turned on and off by software control to prevent the internal lithium battery getting too low in capacity. The USB output is brought to the outside of the device on a standard USB connector 58, which includes the standard voltage divider required for enabling charge to certain smartphones that require it. The USB charge circuit 52 allows the internal lithium battery pack 32 to be charged using a standard USB charger. This charge input uses a standard micro-USB connector 48 allowing standard cables to be used. The 5 V potential provided from standard USB chargers is up-converted to the 12.4 VDC voltage required for charging the internal lithium battery pack using a DC-DC converter 49. The DC-DC converter 49 can be turned on and off via circuit 53 by an output from the microcontroller 1.

In this way, the microcontroller software can turn the charge off if the battery voltage is measured to be too high by the A/D input 22. Additional safety is provided for helping to eliminate overcharge to the internal lithium battery using a lithium battery charge controller 50 that provides charge balance to the internal lithium battery cells 51. This controller also provides safety redundancy for eliminating over discharge of the internal lithium battery.

Figure 3:
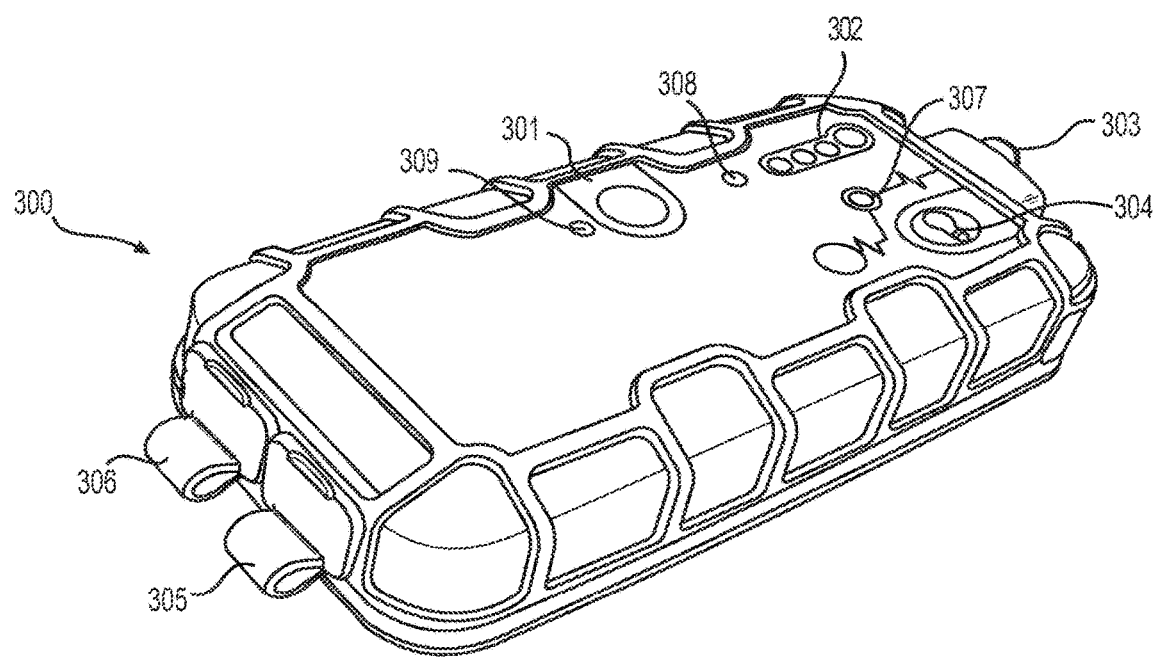
FIG. 3 is a perspective view of a handheld jump starter booster device in accordance with one example embodiment of the invention.

FIG. 3 is a perspective view of a handheld device 300 in accordance with an exemplary embodiment of the invention. 301 is a power on switch. 302 shows the LED "fuel gauge" indicators 61. 303 shows a 12 volt output port connectable to a cable device 400, described further below. 304 shows a flashlight control switch for activating flashlight LEDs 45. 305 is a USB input port for charging the internal lithium battery, and 306 is a USB output port for providing charge from the lithium battery to other portable devices such as smartphones, tablets, music players, etc. 307 is a "boost on" indicator showing that power is being provided to the 12 V output port. 308 is a "reverse" indicator showing that the vehicle battery is improperly connected with respect to polarity. 309 is a "power on" indicator showing that the device is powered up for operation.

Figure 4:
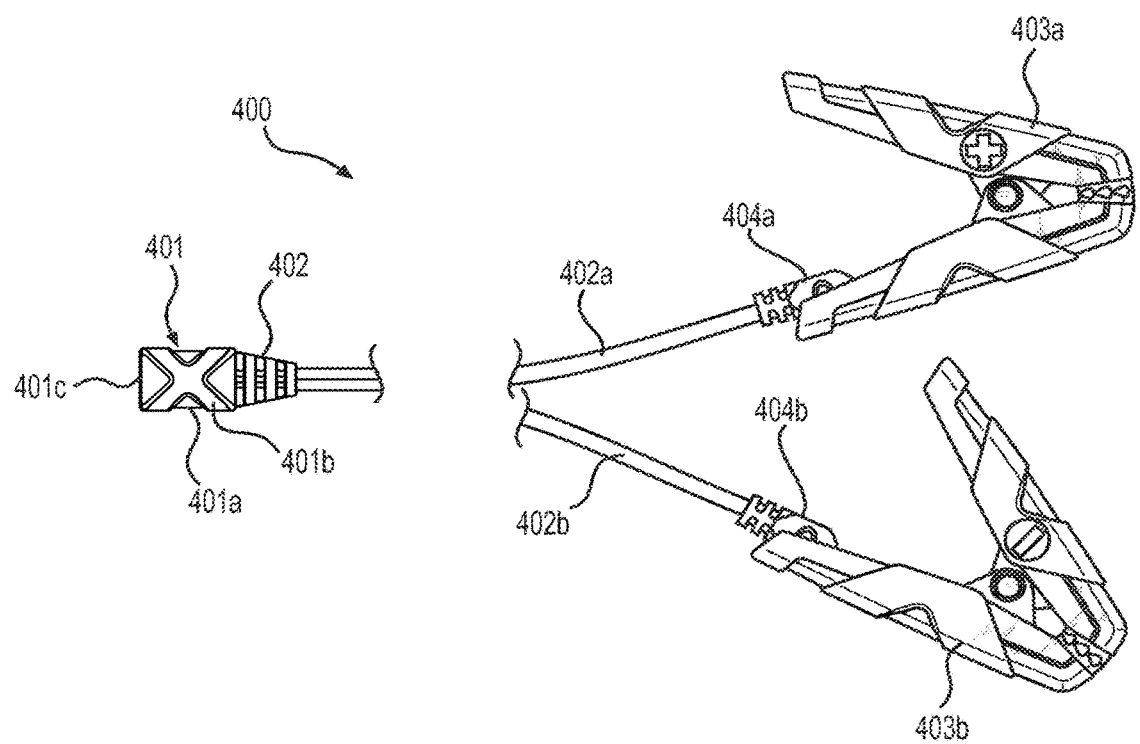
FIG. 4 is a planar view of a jumper cable usable with the handheld jump starter booster device in accordance with another aspect of the invention.
Figure 5:
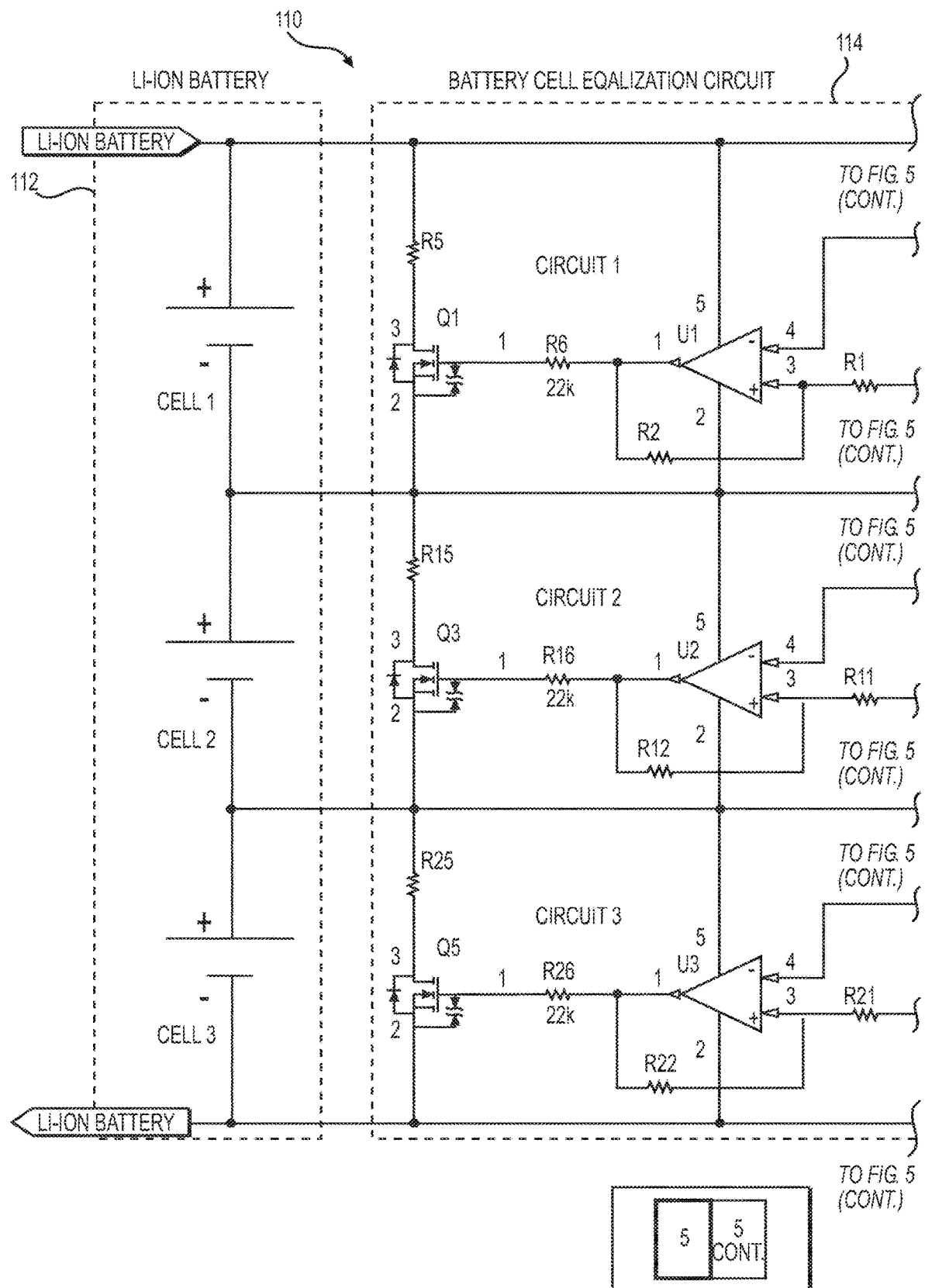
FIG. 5 is a schematic circuit diagram of a battery cell equalization circuit according to the present invention.
Figure 5:
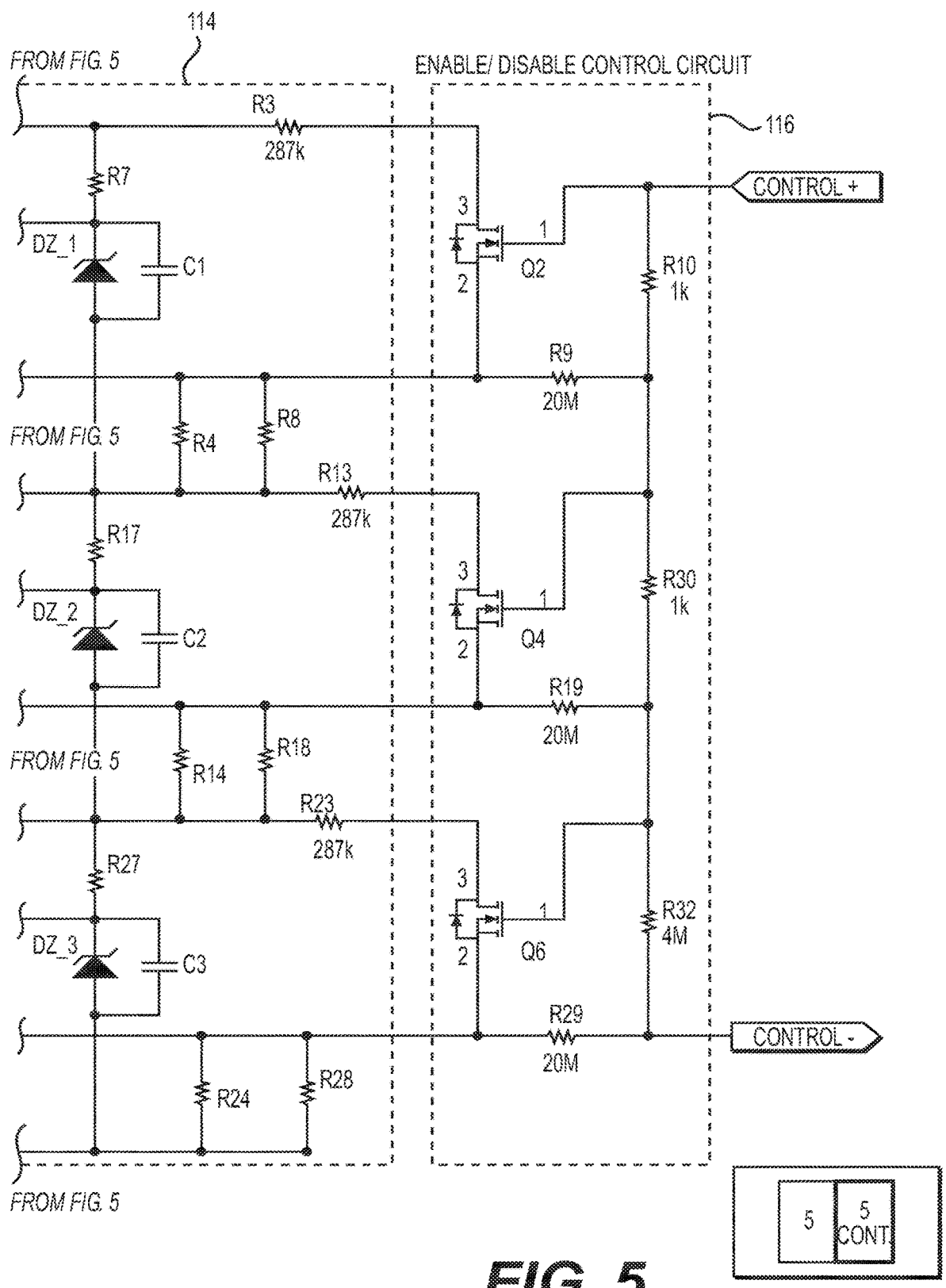

FIG. 4 shows a jumper cable device 400 specifically designed for use with the handheld device 300. Device 400 has a plug 401 configured to plug into 12 volt output port 303 of the handheld device 300. A pair of cables 402a and 402b are integrated with the plug 401, and are respectively connected to battery terminal clamps 403a and 403b via ring terminals 404a and 404b. The port 303 and plug 401 may be dimensioned so that the plug 401 will only fit into the port 303 in a specific orientation, thus ensuring that clamp 403a will correspond to positive polarity, and clamp 403b will correspond to negative polarity, as indicated thereon. Additionally, the ring terminals 404a and 404b may be disconnected from the clamps and connected directly to the terminals of a vehicle battery. This feature may be useful, for example, to permanently attach the cables 302a-302b to the battery of a vehicle. In the event that the battery voltage becomes depleted, the handheld booster device 300 could be properly connected to the battery very simply by plugging in the plug 401 to the port 303.

Battery Cell Equalization

A battery cell equalization circuit 110 is shown in FIG. 1. The battery cell equalization circuit 110 comprises a Li-ion battery 112 having three (3) cells having a nominal battery rating of 12 V, a battery cell equalization circuit 114 having three (3) individual battery cell equalization circuits, and an enable/disable control circuit 116. Each cell has its own independent battery cell equalization circuit, which are essentially identical.

The battery cells are "equalized" using the principle that if any cell voltage exceeds a certain pre-determined upper voltage threshold, it will be discharged through its own load resistor (R5, R15, and R25), until it reaches a certain pre-determined level below that threshold or until the battery charging process is terminated.

Bleeding the charge of a cell through its load resistor may not always result in the net discharge of that cell. For example, if the (externally supplied) charging current through the Li-ion battery 112, which is the same through each cell, is higher than the discharge or bleed current of that cell, it will slow down the effective charging rate of that cell while charging the lower voltage cells at a higher rate allowing them to catch up to the highest voltage cell.

The battery cell equalization circuit 110 is enabled or disabled using a single control signal, which may be generated after evaluating user affected settings or various operational conditions within the jump starter. Disabling the equalization circuit during active cell discharge stops the discharge of the cell(s). Enabling the equalization circuit may or may not cause the cell(s) to be discharged, as that decision depends on the cell voltages.

Operation

Enabling the equalization circuit involves turning ON the MOSFET switches Q2, Q4, Q6, electrically connecting the voltage divider resistors (R3, R4), (R13, R14) and (R23, R24) that scale down the individual cell voltages and feed them to the non-inverting inputs of their respective comparators, allowing them to sense the individual cell voltages. Disabling the equalization circuit turns OFF MOSFET switches Q2, Q4, Q6, disconnecting the resistors (R3, R4), (R13, R14) and (R23, R24) and preventing the cell voltages reaching the comparators' non-inverting inputs. That essentially presents zero voltage to the comparators' non-inverting inputs, causing their output voltages to be zero, which prevents the load resistors R5, R15, R25 from being connected across the cells.

Semiconductor voltage references DZ_1, DZ_2, DZ_3 in series with biasing resistors R7, R17, R27, provide a reference voltage signal to the inverting input of comparators U1, U2, U3, respectively. The resistor divider R3, R4 (or R13, R14 or R23, R24) values are chosen such the scaled cell voltage equals the reference voltage when the cell voltage reaches the upper voltage threshold at which the discharge process needs to be started. If any scaled cell voltage being fed to the non-inverting input of its respective comparator exceeds the corresponding reference voltage present at the inverting input, then the comparator's output voltage will be high, exceeding the gate-source threshold voltage of the enhancement mode MOSFET switch Q1 (or Q3, Q5), causing it to turn ON and connecting load resistor R5 (or R15, R25) across the corresponding battery cell.

Resistor R8 (or R18, R28) lies in parallel with R4 (or R14, R24) and allows fine tuning of the voltage division, allowing the use of cheaper, commonly available mass produced resistors, instead of a single specific non-standard value. Further consideration in choosing the value of the voltage divider resistors is to minimize the current drawn by these resistors to avoid draining the battery cells, while at the same time keeping their value small enough to allow enough current through these voltage divider resistors that is significantly greater than the comparators' input bias current, so as to effectively not load the voltage divider.

R1, R2 (R11, R12 or R21, R22) control the "hysteresis" band that determines the lower cell voltage level to which the cell(s) needs to be discharged, once the discharge process has been started.

Li-ion battery 112 can store a significant amount of energy, which can cause high current in the cells, if their terminals get short-circuited un-intentionally, resulting in excessive heat generation and damage to the jump starter unit or other undesired catastrophic consequences. High valued resistors R6, R16, R26 have been added between the output of comparator U1 (or U2, U3) and the switches QI, Q3, Q5 to limit the amount of current through each cell to a safe value, in the case when somehow the output of U1 (or U2, U3) gets clamped to its cell voltage and the gate-source terminals of Q1 (or Q3, Q5) get short-circuited.

The gate-source threshold voltage of MOSFETs Q1, Q3, Q5 has been chosen to be a minimum of 1.2 V, as opposed to a few tenths of a volt, in order to prevent their spurious turning ON due to stray voltages present between their gate-source terminals. The comparators and voltage references used are of the "nano power" category to not drain the battery cells significantly over time, thus maintaining its jump starting capacity.

Capacitors C1, C2, C3 are kept to allow stable operation of the voltage references DZ_1, DZ_2, DZ_3.

Enable/Disable Control Circuit Operation

Turning ON enhancement mode MOSFET switches Q2, Q4, Q6 enables the battery cell equalization circuit 110. Turning them OFF, disables the battery cell equalization circuit 110. The switches Q2, Q4, Q6 are turned ON simultaneously by applying a nominal 12V control voltage signal between the terminals marked "Control +", "Control –". They are simultaneously turned OFF by applying a nominal zero volt control signal. In this implementation, the control voltage needed to be greater than or equal to the nominal voltage of the battery whose cells are being equalized. The nominal 12 V control voltage level was chosen due to its availability within, for example, a hand-held jump starter unit, as it is readily obtained via the external charge port or from the Li-ion battery 112 itself.

Placement of the voltage divider resistor R3 (or R13, R23) on the drain (terminal 3) side of MOSFET switches Q2 (Q4 or Q6), instead of on the source (terminal 2) side, is critical to the proper operation of the enable/disable circuit 116. If it is desired to keep Q2 (Q4, Q6) turned ON, it is essential to maintain its gate-source voltage at a level higher than its gate-source threshold voltage. When Q2 (Q4, Q6) gets turned on, the voltage drop across R3 (R13, R23) causes its source terminal to be pulled below its corresponding positive cell terminal potential, enabling a gate to source voltage at a level higher than its chosen gate-source threshold voltage. To allow a larger voltage drop across R3 (R13, R23), its value is kept much larger than R4 (R14, R24), such that it would allow a standard valued, readily available voltage reference DZ_1 (DZ_2, DZ_3) to be chosen.

The gate-source threshold voltage of MOSFETs Q2, Q4, Q6 has been chosen to be a minimum of 1.1 V, as opposed to a few tenths of a volt, in order to prevent their spurious turning ON due to stray voltages present between their gate-source terminals. This in turn imposes a higher voltage requirement across the gate-source voltage of Q2,Q4, Q6 in order to turn them ON and keep them in that state. It can be seen that if R3 were kept on the source (terminal 2) side of Q2, then the source terminal of Q2 would be pulled to the nominal 12 V battery potential as soon as Q2 were turned ON with a 12 V control signal. However, this would result in a zero voltage applied between the gate-source of Q2, immediately turning it back OFF.

The values of R10, R30, R32 have been chosen to allow an equitable distribution of the applied voltages between the gate-source terminals of Q2, Q4, Q6 when the 12 V control voltage is present. R10, R32 are kept much smaller than R32 to allow similar amounts of current to reach the gates of Q2, Q4, Q6. Large valued resistors R9, R19 act as another layer of safety by further introducing electrical resistance between the individual battery cells 112 as well as between the battery and the control voltage source by limiting fault current in case of short circuits across multiple components of the circuit. Value R32 needs to be kept large enough so that most of the control voltage drops across it, in case the control voltage source has significant resistance in series with it.

EXAMPLE #1

The battery cell equalization circuit 110 can be applied or installed into the battery jump start boost device disclosed in U.S. Pat. No. 9,007,015, which is incorporated herein by reference.

The invention having been thus described, it will be apparent to those skilled in the art that the same may be varied in many ways without departing from the spirit or scope of the invention. Any and all such variations are intended to be encompassed within the scope of the following claims.

The invention claimed is:

1. A portable or hand held jump starting apparatus, comprising:
    a battery comprising a plurality of individual battery cells connected in series;
    a battery cell equalization circuit connected to the battery, the battery cell equalization circuit comprising:
        a plurality of individual battery cell equalization circuits each provided for each respective battery cell; and
        a plurality of load resistors each provided for each respective battery cell,
        wherein the individual battery cell equalization circuits are configured to discharge an individual battery cell by its particular load resistor upon the individual battery cell reaching a cell voltage exceeding a pre-determined upper voltage threshold until the individual battery cell reaches a pre-determined lower voltage level below the upper voltage threshold or until the individual battery cell charging process is terminated.

2. The apparatus according to claim 1, wherein the battery cell equalization circuits are configured to discharge or slow a charging rate upon the particular cell reaching the cell voltage exceeding the pre-determined upper voltage threshold while charging the lower voltage cells at a higher rate, allowing the lower voltage cells to catch up to the particular cell having a highest voltage.

3. The apparatus according to claim 1, wherein the battery cell equalization circuit is configured to be enabled or disabled using a single control signal.

4. The apparatus according to claim 3, wherein disabling the battery cell equalization circuit during active battery cell discharge stops the discharge of the battery cells.

5. The apparatus according to claim 3, wherein the battery cell equalization circuit comprises MOSFET switches and voltage divider resistors, and wherein enabling the battery cell equalization circuit involves turning on the MOSFET switches electrically connecting the voltage divider resistors that scale down individual cell voltage of the battery cells and feed them to non-inverting inputs of respective comparators, allowing them to sense the individual cell voltages.

6. The apparatus according to claim 5, wherein disabling the battery cell equalization circuit turns off the MOSFET switches disconnecting the resistors and preventing cell voltages reaching the comparators' non-inverting signals and presenting zero voltage to the comparator's non-inverting inputs, causing their output voltages to be zero, which prevents the load resistors from being connected across the cells.

7. The apparatus according to claim 1, wherein the battery is a Li-ion battery.

8. The apparatus according to claim 7, wherein the battery is a Li-ion battery pack comprising a plurality of Li-ion battery cells.

9. The apparatus according to claim 1, further comprising an output port having positive and negative polarity outputs; a vehicle battery isolation sensor connected in circuit with the positive and negative polarity outputs, configured to detect presence of a vehicle battery connected between the positive and negative polarity outputs; a reverse polarity sensor connected in circuit with the positive and negative polarity outputs, configured to detect polarity of a vehicle battery connected between the positive and negative polarity outputs and to provide an output signal indicating whether positive and negative terminals of the vehicle battery are properly connected with the positive and negative polarity outputs of the output port; a power switch connected between the internal power supply and the output port; and a microcontroller configured to receive input signals from the vehicle isolation sensor and the reverse polarity sensor, and to provide an output signal to the power switch, such that the power switch is turned on to cause the internal power supply to be connected to the output port in response to signals from the sensors indicating the presence of a vehicle battery at the output port and proper polarity connection of positive and negative terminals of the vehicle battery with the positive and negative polarity outputs, and is not turned on when signals from the sensors indicate either the absence of a vehicle battery at the output port or improper polarity connection of positive and negative terminals of the vehicle battery with the positive and negative polarity outputs, wherein the battery equalization circuit is a separate isolated circuit relative to the circuit with the positive and negative polarity outputs, and wherein the microcontroller is connected to and controls the battery equalization circuit.

10. The apparatus according to claim 9, wherein the power switch comprises a plurality of FETs connected in parallel.

11. The apparatus of claim 9, wherein the vehicle isolation sensor and reverse polarity sensor comprise optically coupled isolator phototransistors.

12. The apparatus of claim 9, further comprising a plurality of power diodes coupled between the output port and the internal power supply to prevent back-charging of the internal power supply from an electrical system connected to the output port.

13. The apparatus of claim 9, further comprising a temperature sensor configured to detect temperature of the internal power supply and to provide a temperature signal to the microcontroller.

14. The apparatus of claim 9, further comprising a voltage measurement circuit configured to measure output voltage of the internal power supply and to provide a voltage measurement signal to the microcontroller.

15. The apparatus of claim 9, further comprising a voltage regulator configured to convert output voltage of the internal power supply to a voltage level appropriate to provide operating power to internal components of the apparatus.

16. A portable or hand held jump starting apparatus, comprising:

a battery comprising a plurality of individual battery cells connected in series;

a battery cell equalization circuit connected to the battery, the battery cell equalization circuit comprising a plurality of individual battery cell equalization circuits each provided for each respective battery cell, the individual battery cell equalization circuits each comprising:

a first MOSFET switch configured to electrically connect voltage divider resistors that scale down an individual battery cell voltage and feed the individual battery cell voltage to a non-inverting input of a respective comparator allowing the respective comparator to sense the individual battery cell voltage;

a second MOSFET switch configured to limit the amount of current through the individual battery cell to a safe value, in case an output of the comparator gets clamped to its cell voltage and gate-source terminals of the second MOSFET switch get short-circuited; and a load resistor connected across the individual battery cell, wherein the individual battery cell equalization circuits are configured to discharge each individual battery cell by its particular load resistor upon the individual battery cell reaching a cell voltage exceeding a pre-determined upper voltage threshold until the individual battery cell reaches a pre-determined lower voltage level below the upper voltage threshold or until the particular individual battery cell charging process is terminated.

\* \* \* \* \*